(12) United States Patent
Ernst et al.

(10) Patent No.: US 7,510,360 B2
(45) Date of Patent: Mar. 31, 2009

(54) GARAGE HOOK

(75) Inventors: Richard J. Ernst, San Diego, CA (US); John F. Horvath, Hoffman Estates, IL (US)

(73) Assignee: Illinois Tool Works Inc., Glenview, IL (US)

( * ) Notice: Subject to any disclaimer, the term of this patent is extended or adjusted under 35 U.S.C. 154(b) by 97 days.

(21) Appl. No.: 11/245,385

(22) Filed: Oct. 6, 2005

(65) Prior Publication Data

US 2006/0056939 A1     Mar. 16, 2006

Related U.S. Application Data

(63) Continuation-in-part of application No. 10/939,795, filed on Sep. 13, 2004, now Pat. No. 7,160,074.

(51) Int. Cl.
*F16B 45/00* (2006.01)
*A46B 17/06* (2006.01)

(52) U.S. Cl. .............. 411/400; 248/110; 248/217.4

(58) Field of Classification Search .......... 411/400, 411/401, 386, 387.1–387.8; 248/303, 304, 248/110, 217.4, 684
See application file for complete search history.

(56) References Cited

U.S. PATENT DOCUMENTS

| 252,752 | A | * | 1/1882 | Tower | ............. 126/56 |
| 350,209 | A |   | 10/1886 | Parmelee | |
| 525,752 | A |   | 9/1894 | Tower | |
| 927,483 | A | * | 7/1909 | Bradley | ............. 248/303 |
| 1,095,068 | A | * | 4/1914 | Bate | ............. 248/110 |
| 1,201,295 | A | * | 10/1916 | Handee | ............. 248/217.4 |
| 1,270,036 | A | * | 6/1918 | LeClaire | ............. 248/303 |
| 1,491,203 | A | * | 4/1924 | Enoch | ............. 248/217.4 |
| 1,963,799 | A |   | 6/1934 | Nelson | |
| 2,601,872 | A | * | 7/1952 | Kaufmann | ............. 139/88 |
| 3,049,323 | A |   | 8/1962 | Peterka | |
| 3,263,949 | A |   | 8/1966 | Conrad | |

(Continued)

FOREIGN PATENT DOCUMENTS

DE      040 16 724      11/1991

(Continued)

OTHER PUBLICATIONS

PCT Search Report for PCT/US 2006/020693.

(Continued)

*Primary Examiner*—Flemming Saether
(74) *Attorney, Agent, or Firm*—Mark W. Croll; Christopher P. Rauch; Beem Patent Law Firm

(57) ABSTRACT

In one aspect, a holder mountable to a friable substrate may include a self-drilling anchor, a wall engaging flange having an opening for receiving a fastener, and at least one leg extending from the flange for holding an object. In another aspect, a holder may include a self-drilling anchor, a wall engaging flange, and a pair of U-shaped legs for holding an object. In still another aspect, a holder may include a self-drilling anchor, a wall engaging flange, at least one leg extending from the flange for holding an object and a recess for receiving a rotary driver. A pair of openings may be provided in the flange for receiving a threaded fastener.

20 Claims, 4 Drawing Sheets

U.S. PATENT DOCUMENTS

| | | | |
|---|---|---|---|
| 3,404,476 A | 10/1968 | Hoffman, Jr. | |
| 3,641,866 A | 2/1972 | Mortensen | |
| 4,298,298 A | 11/1981 | Pontone | |
| 4,441,619 A | 4/1984 | Gibitz | |
| 4,601,625 A | 7/1986 | Ernst | |
| 4,763,456 A | 8/1988 | Giannuzzi | |
| 4,892,429 A | 1/1990 | Giannuzzi | |
| 5,039,262 A | 8/1991 | Giannuzzi | |
| 5,059,077 A * | 10/1991 | Schmid | 411/400 |
| 5,160,225 A | 11/1992 | Chern | |
| 5,190,425 A | 3/1993 | Wieder et al. | |
| 5,234,299 A | 8/1993 | Giannuzzi | |
| 5,308,203 A | 5/1994 | McSherry et al. | |
| 5,372,346 A * | 12/1994 | Upchurch et al. | 248/304 |
| 5,482,418 A | 1/1996 | Giannuzzi | |
| 5,529,449 A | 6/1996 | McSherry et al. | |
| 5,536,121 A | 7/1996 | McSherry | |
| 5,558,479 A | 9/1996 | McElderry | |
| 5,692,864 A | 12/1997 | Powell et al. | |
| 5,752,792 A | 5/1998 | McSherry | |
| 5,833,415 A | 11/1998 | McSherry | |
| 5,944,295 A * | 8/1999 | McSherry | 248/304 |
| 6,003,691 A | 12/1999 | Owen | |
| 6,079,921 A | 6/2000 | Gauthier et al. | |
| 6,139,236 A | 10/2000 | Ito | |
| 6,186,716 B1 | 2/2001 | West et al. | |
| 6,196,780 B1 | 3/2001 | Wakai et al. | |
| 6,250,865 B1 | 6/2001 | McSherry | |
| 6,354,779 B1 | 3/2002 | West et al. | |
| 6,382,892 B1 | 5/2002 | Hampfling | |
| 6,419,436 B1 * | 7/2002 | Gaudron | 411/426 |
| 6,484,888 B2 * | 11/2002 | Miller | 211/5 |
| 6,676,350 B1 * | 1/2004 | McSherry et al. | 411/135 |
| 6,846,142 B2 * | 1/2005 | Gens | 411/411 |

FOREIGN PATENT DOCUMENTS

| | | |
|---|---|---|
| DE | 9301098 U1 | 3/1993 |
| DE | 29502052 U1 | 3/1995 |
| DE | 093 01 098 | 1/1997 |
| DE | 19 852 339 | 5/2000 |
| DE | 201 11 194 | 10/2001 |
| EP | 0874165 A1 | 10/1998 |
| EP | 0 951 869 | 10/1999 |
| EP | 1 050 689 | 8/2000 |
| EP | 1298331 B1 | 4/2003 |
| FR | 439 431 ET 439 432 | 9/1996 |
| WO | WO-99/05420 | 2/1999 |
| WO | WO-2004/053341 | 6/2004 |
| WO | 2004/079209 | 9/2004 |
| WO | 2004/079210 | 9/2004 |
| WO | WO-2004/079209 | 9/2004 |
| WO | WO-2004/079210 | 9/2004 |

OTHER PUBLICATIONS

PCT Written Opinion for PCT/US 2006/020693.

"Existing Garage Hook Summary".

* cited by examiner

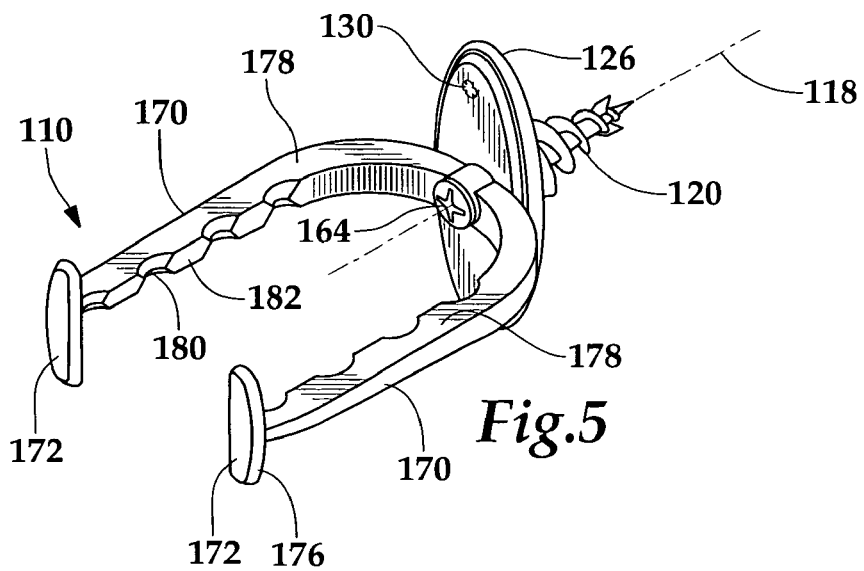
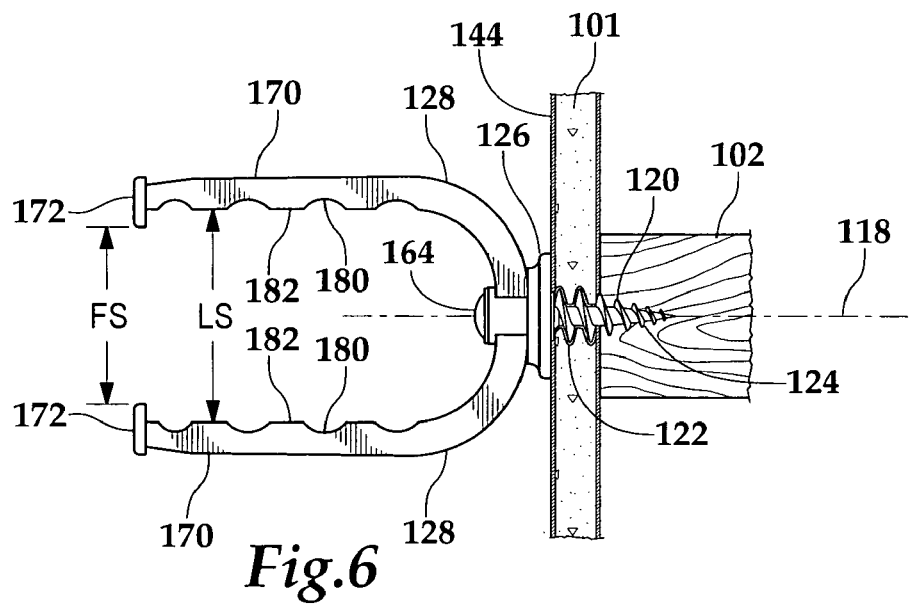
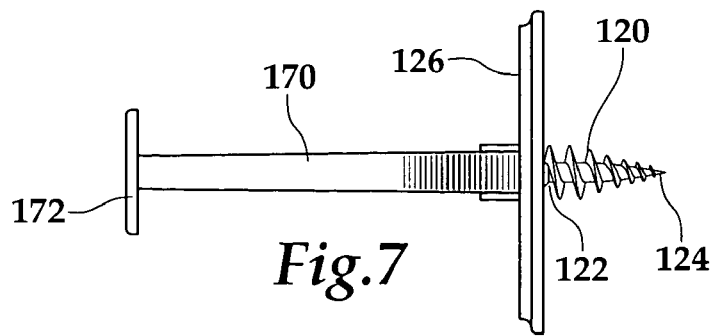

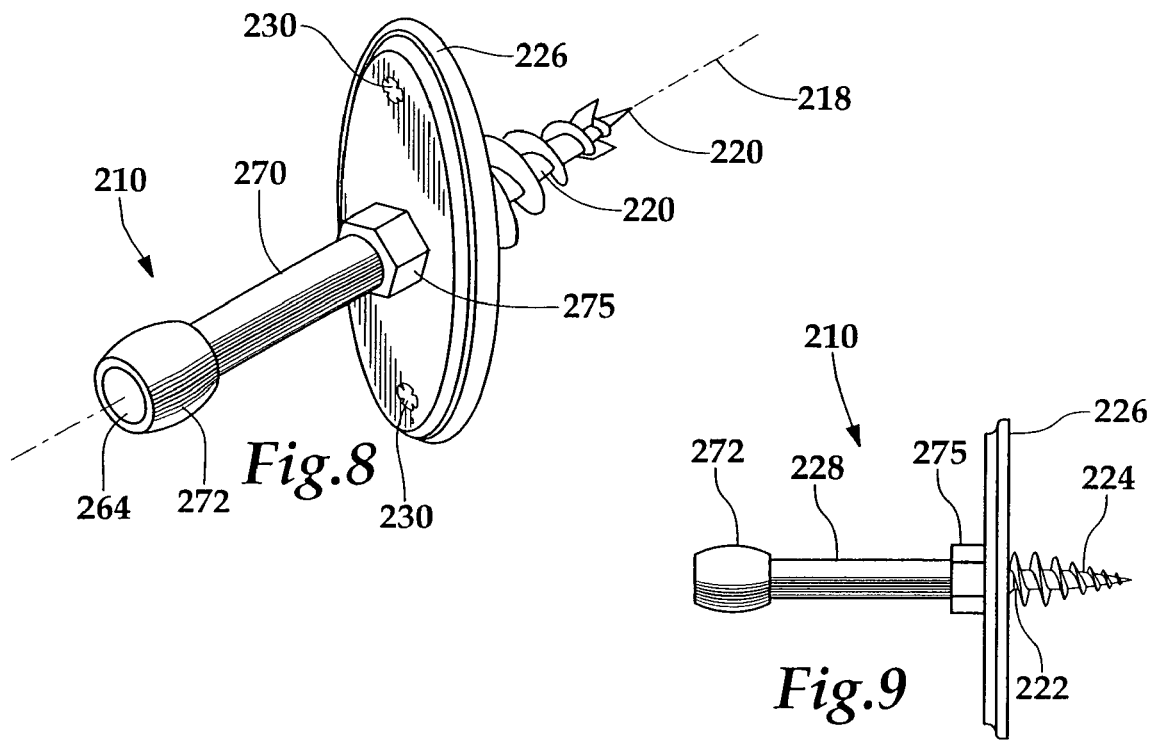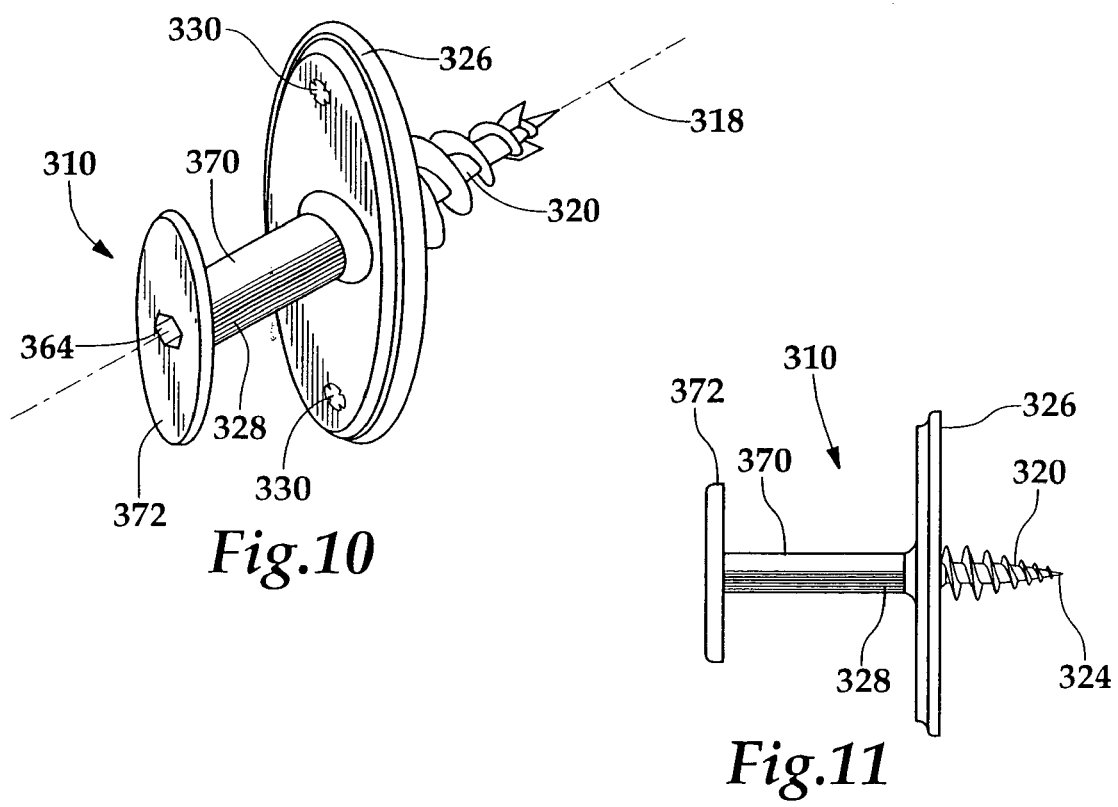

GARAGE HOOK

This application is a continuation-in-part of U.S. patent application Ser. No. 10/939,795, filed on Sep. 13, 2004 now U.S. Pat. No. 7,160,074.

BACKGROUND OF THE INVENTION

1. Field of the Invention

The present invention is directed to a holder, commonly called a garage hook, mountable in a friable substrate such as drywall, for holding an object such as a household or garden item, e.g., a tool such as a spade, a bicycle, or the like.

2. Description of the Related Art

Garage hooks typically are wire-like with a drywall penetrating end that is straight, pointed, and typically threaded like a screw for driving into drywall and sometimes a stud. An opposite end usually forms one of a variety of configurations of hooks. Driving the garage hook commonly is accomplished by gripping and turning the hook end to drive the point and the threads into the drywall.

Anyone who has attempted to install wire-like garage hooks knows that it is easier said than done. A firm, steady, axial, pushing-while-rotating force is needed, and driving typically is stuttered and wobbly. If the user hits a stud squarely, great effort and skill are required to force the point and the threads into the stud, which may cause the threads to strip out the soft, friable drywall, often resulting in an unsightly and uncertain installation. More commonly, the user does not hit a stud, and the installation may look sound but is actually wobbly and loose. Moreover, screw-like threads have little pullout strength in drywall alone and can easily strip out the drywall during installation. In use, the garage hook may turn, particularly after repeated loading, unloading and bumps, causing the garage hook to loosen, fall or dump its load from the wall, resulting in damage to the load, the wall, or other garaged property, such as a car.

For additional pullout strength, some garage hooks, see, e.g., U.S. Pat. No. 6,676,350 to McSherry, rely on large drywall-anchor-like threads. Such garage hooks sometimes require pre-drilling and are often defeated if they hit a stud. Although garage hooks with drywall threads provide higher pullout strength in drywall than screw-like threads, they still usually can only hold objects of light to moderate weight.

Pre-drilling into studs or wood may be considered for many kinds of garage hooks, however, in each case, additional planning, tools and time are required. For example, some garage hooks require one or more screws to be driven, but unless pilot holes are positioned, sized and pre-drilled with great care, efforts to drive screws can result in stripping of the drywall.

Illinois Tool Works Inc., assignee of this application, has made many advances in drywall anchors. An anchor sold under the trademark E-Z ANCOR, see commonly assigned U.S. Pat. No. 4,601,625, is a self-drilling drywall anchor. Another anchor, sold under the trademark STUD SOLVER, see commonly assigned U.S. patent application Ser. No. 60/510,708, is a self-drilling drywall anchor capable of penetrating studs. Until now, however, the improvements in drywall anchor technology have not been reflected in garage hooks.

What is needed is a holder mountable to a friable substrate that may be easily installed for increased pullout resistance and load capacity.

BRIEF SUMMARY OF THE INVENTION

In one aspect of the invention, a holder includes a self-drilling anchor having an axis, a wall contacting flange, and at least one leg for holding an object. The at least one leg is generally symmetrical about one of said axis and a second axis parallel to said axis.

In another aspect of the invention, a holder includes a self-drilling anchor, a wall contacting flange and a U-shaped pair of legs for holding an object, wherein each one of said pair of legs extends from said flange to a distal portion having a foot, and wherein said pair of legs and each said foot are generally symmetrical about one of said axis and a second axis parallel to said axis.

In still another aspect of the invention, a holder includes a self-drilling anchor having an axis, and extending from a wall-contacting flange having an opening for receiving a fastener, and at least one leg for holding an object extending from said wall-contacting flange. The at least one leg is generally symmetrical about one of said axis and a second axis parallel to said axis. The combination of the self-drilling anchor and the fastener may provide increased pullout resistance and load capacity in a friable substrate. For ease of use and improved performance, the holder may have a recess for receiving a rotary driver for easier and surer installation.

These and other features and advantages are evident from the following description of the present invention, with reference to the accompanying drawings.

BRIEF DESCRIPTION OF THE SEVERAL VIEWS OF THE DRAWINGS

FIG. 5 is a perspective view of another embodiment of a holder mountable to a friable substrate for holding an object.

FIG. 6 is a plan view of the holder of FIG. 5 installed within the friable substrate and a support stud.

FIG. 7 is a side view of the holder of FIG. 5 installed within the friable substrate, shown with two fasteners installed.

FIG. 8 is a perspective view of another embodiment of a holder mountable to a friable substrate for holding an object.

FIG. 9 is a plan view of the holder of FIG. 8 installed within the friable substrate and a support stud.

FIG. 10 is a perspective view of another embodiment of a holder mountable to a friable substrate for holding an object.

FIG. 11 is a plan view of the holder of FIG. 10 installed within the friable substrate and a support stud.

DETAILED DESCRIPTION OF THE INVENTION

Figure 1:
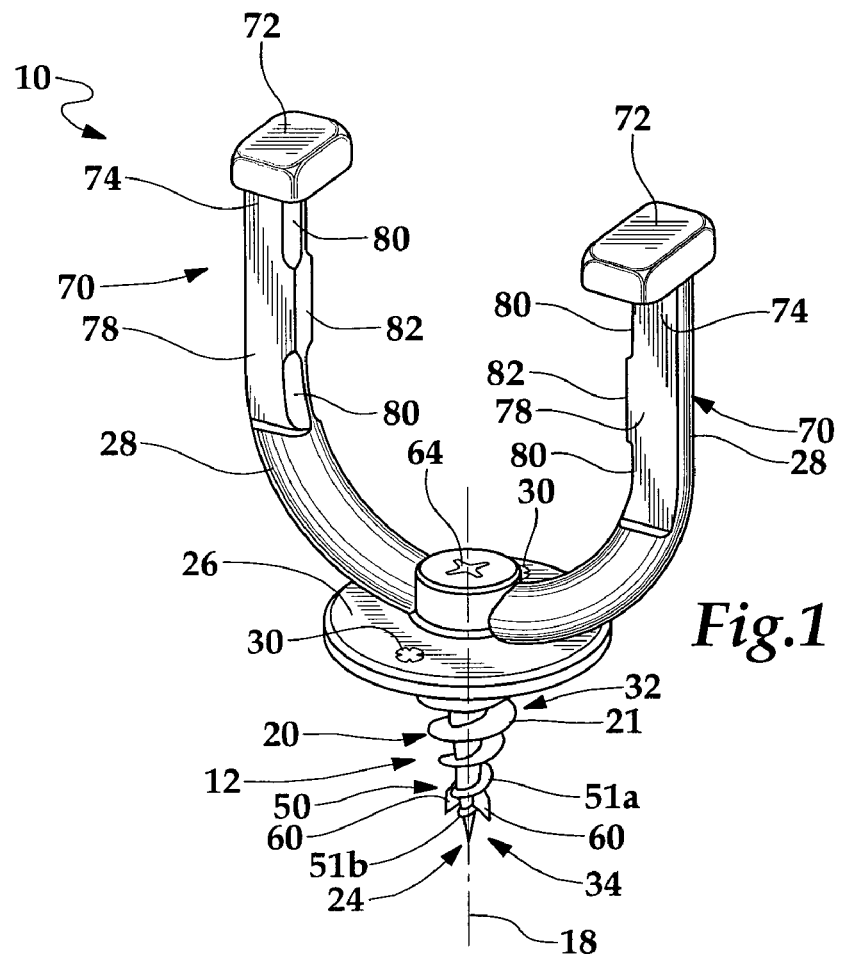
FIG. 1 is a perspective view of a holder mountable to a friable substrate for holding an object.
Figure 4:
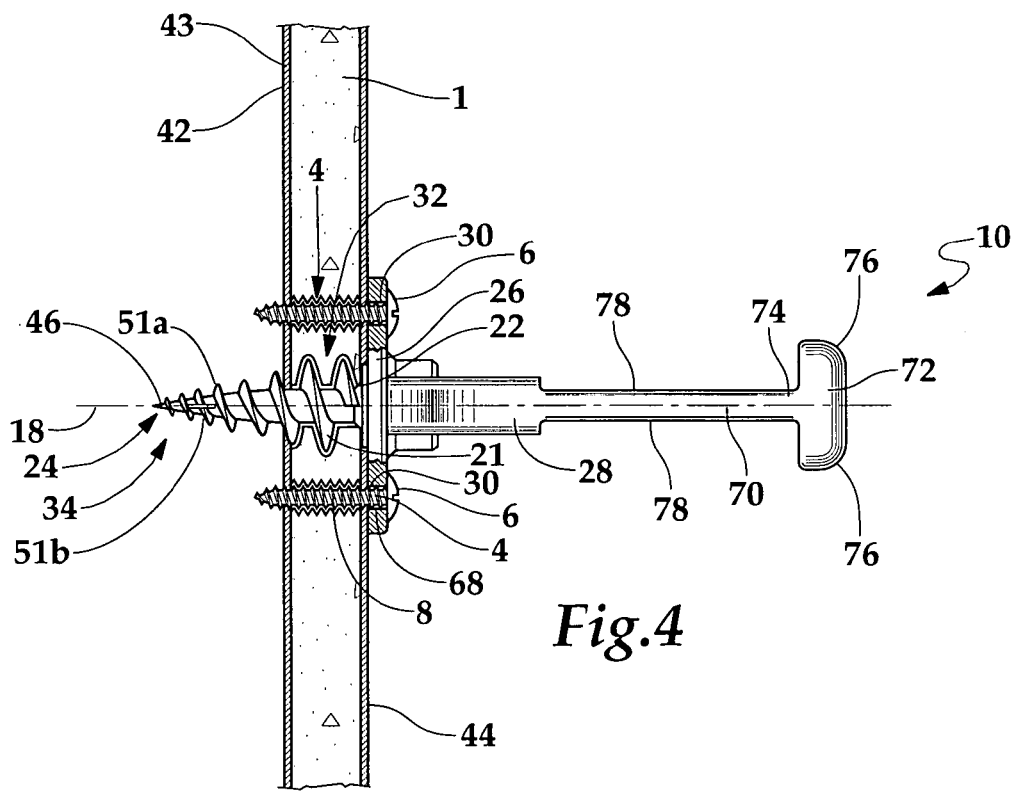
FIG. 4 is a side view of the holder installed within the friable substrate, shown with two fasteners installed.

Referring to FIGS. 1 and 4, a holder 10 includes a self-drilling anchor 12 having axis 18, exterior threading 20 for engaging friable substrate 1, proximal end 22, and drilling end 24, a flange 26 connected to proximal end 22, wherein flange 26 is wider than a largest outer diameter of threading 20 and flange 26 has at least one and preferably a pair of openings 30 spaced from axis 18, each capable of receiving a fastener 4, and at least one and potentially two or more legs 28 extending from flange 26 for holding an object. Holder 10 and fastener 4 spaced from axis 18 provide for higher overall pullout resistance and load capacity for holder 10.

Holder 10 is mountable to a friable substrate 1 and is used for holding, typically hanging, an object (not shown), such as a tool, a ladder, a broom, a spade, a bicycle, or other objects on a friable substrate such as drywall 1. Holder 10 allows a user to select a position anywhere on drywall 1 that is feasible to place the object desired to be held. Holder 10 may be used for holding tools or other objects on interior or exterior friable substrates of a residential home and is particularly useful for hanging tools or other objects from a wall or ceiling within a garage; therefore, holder 10 will be described and shown as a garage hook. However, holder 10 may be equally applicable to other applications.

The friable substrate may be one of several materials used in construction, such as stucco, plaster, or gypsum based drywall 1 sold under the trademark SHEETROCK by United States Gypsum. Drywall 1 typically has a thickness T of about ½ inch or about ⅝ inch, but it may be obtained in other thicknesses, such as about ⅜ inch. Typically, friable substrates such as drywall 1 are mounted to support studs 2, such as wood support studs, for example 2×4 studs or the like, evenly spaced apart, e.g. every 16 inches, or metal support studs, such as steel support studs. Studs 2 are substantially more resistant to pullout than drywall 1 because they are more solid and much less likely to break apart.

In one embodiment, shown in FIG. 4, fastener 4 includes threads 8, and opening 30 engages fastener threads 8 to meter and stop the rotation of fastener 4 before it can strip out drywall 1, providing for threaded engagement between fastener threads 8 and drywall 1 and greater holding strength and pullout resistance. The metering causes fastener 4 to tap mating threads into drywall 1 without stripping out drywall 1, so that fastener threads 8 engage drywall 1 and provide additional overall pullout strength between holder 10 and drywall 1. Holder 10 may be made from a sturdy material such as plastic, nylon, steel or aluminum, and in one embodiment, cast zinc. Even after fastener head 6 abuts flange 26, a user may continue to apply torque to fastener 4 without stripping out drywall 1 because flange 26 is sturdier than drywall 1 and the grip between fastener threads 8 and flange 26 preferably does not allow continued rotation of fastener 4. Preferably, the thickness of flange 26 is large enough so that the inside area of openings 30 is adequate enough to engage fastener threads 8.

The threaded engagement between fastener threads 8 and opening 30 may be accomplished by sizing opening 30 slightly smaller than the outer diameter of fastener 4, providing threading (not shown) within each opening 30 that mates with fastener threads 8, a tapped opening 30 (not shown), or providing splines 68. In one embodiment shown in FIG. 2, flange 26 includes a set of splines 68 which protrude radially into each opening 30. Preferably, splines 68 have a radial extent that defines an inner diameter of each opening 30 that may be smaller than the outer diameter of fastener threads 8. Splines 68 enhance the engagement between fastener threads 8 and opening 30 because fastener threads 8 become threadingly engaged with splines 68, and hence with opening 30 of flange 26. Splines 68 may be formed of zinc during casting of holder 10.

Each opening 30 may be radially spaced from axis 18 so that fastener 4 will be positioned within drywall 1 at a predetermined distance from anchor 12, so that the engagement between fastener 4 and drywall 1 provides additional resistance to pullout. Fastener 4 also rotationally locks holder 10 in place to prevent rotation and loosening of holder 10. Preferably, one of the openings 30 is positioned generally vertically above axis 18, as shown in FIG. 4, so that the increased pullout strength acts to prevent holder 10 from pivoting outwardly away from drywall 1 about anchor 12. It has been found that installing holder 10 with a fastener 4 positioned above axis 18 with fastener threads 8 threadingly engaged in opening 30 and drywall 1 increases the shear load holder 10 can withstand from about 10 to 20 pounds when holder 10 is installed without fastener 4 to about 50 pounds, or more when fastener 4 is inserted through upper opening 30 and engaged with drywall 1.

Figure 2:
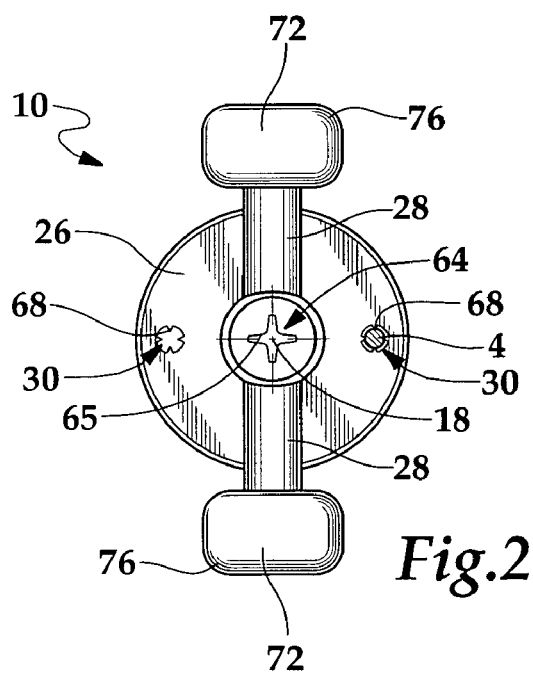
FIG. 2 is an end view of the holder, shown with a cross-section of a fastener installed.

Preferably, at least two openings 30 are included in flange 26, as shown in FIGS. 2 and 4, wherein each opening 30 is spaced from axis 18 and is capable of receiving fastener 4, and preferably each opening 30 is capable of engaging fastener threads 8. Preferably, openings 30 are evenly spaced around flange 26. In the embodiment shown in FIG. 2, wherein there is a pair of openings 30, each opening 30 may be on generally opposite sides of axis 18 and spaced evenly about 180° around axis 18. Openings 30 are preferably symmetrical about axis 18 so that after driving anchor 12 until flange 26 initially contacts drywall 1, a user need not rotate holder 10 more than about an additional 179° to position an opening 30 generally vertically above axis 18. A user also may insert a fastener 4 through the lower opening 30 located vertically below axis 18, which has been found to increase the overall load capacity of holder 10 by approximately an additional 5 to 10 pounds or more over the increased load capacity provided by the fastener 4 mounted in the upper opening 30.

Preferably, holder 10 includes a recess 64, such as the Phillips recess 64 in flange 26 shown in FIGS. 1 and 2, for receiving a rotary driver (not shown) so that holder 10 may be installed with a driving tool, such as a screwdriver or a drill with a screwdriver bit. Recess 64 may be in a protrusion extending outwardly from flange 26. Recess 64 is preferably coaxial with axis 18 and includes torque transmitting surfaces 65 so that torque may be transmitted from the rotary driver to rotate anchor 12 to drive anchor 12 through drywall 1. A user may also drive anchor 12 through drywall 1 by manually rotating legs 28, especially for final positioning after initially driving holder 10 with a rotary driver.

Figure 3:
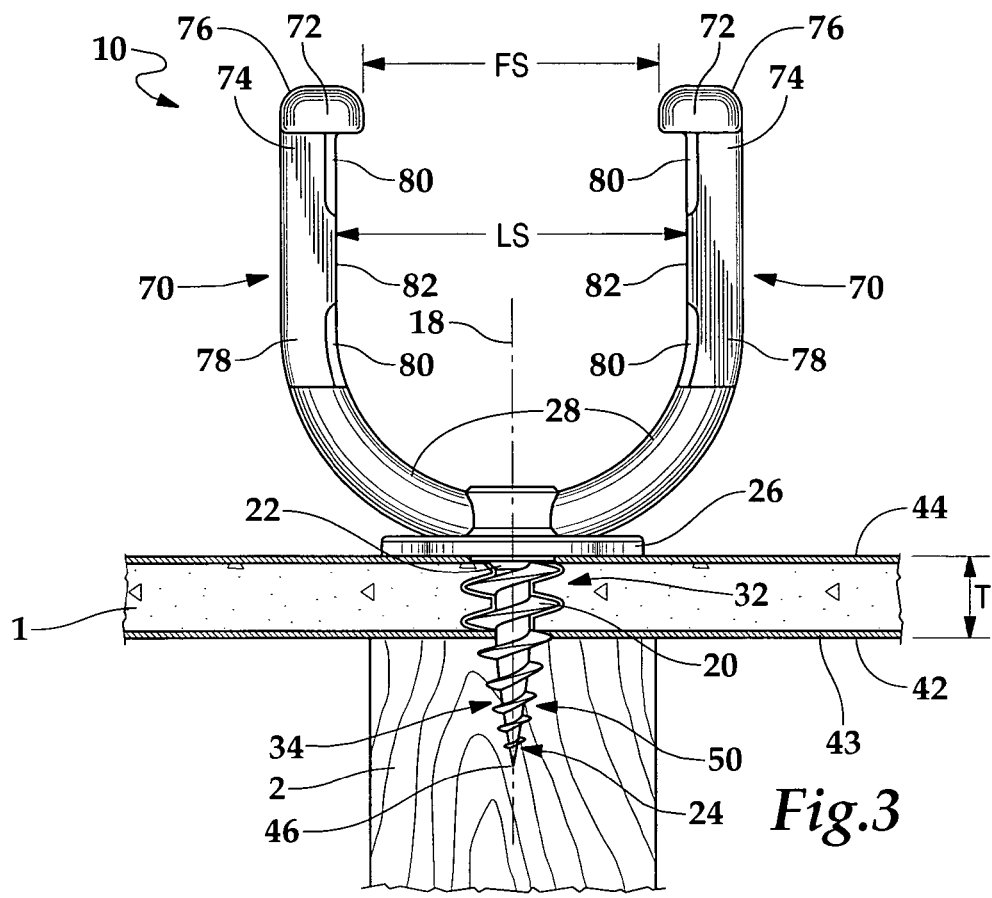
FIG. 3 is a plan view of the holder installed within the friable substrate and a support stud.

One or more legs 28 extend from flange 26, providing a place to hang an object. Legs 28 may extend radially and axially outward from the flange 26 and protrusion to a distal end 70 spaced axially beyond the protrusion. Legs 28 may come in many configurations, including straight legs, J-shaped legs, C-shaped legs, bicycle hooks, ladder hooks, tool hooks, coat or hat hooks, or a U-shaped pair of legs 28. Each leg 28 may extend axially out from flange 26, as shown in FIGS. 3 and 4, or may extend laterally along outer drywall surface 44.

Continuing with FIGS. 2 and 4, in one embodiment, a pair of legs 28 forms a U-shape. A U-shaped holder 10 may be particularly useful for holding long handled objects, such as a spade or broom, so that the handle fits between legs 28 and the spade blade or the broom head rests on legs 28. Preferably, legs 28 are diametrically opposed, symmetrical about axis 18, and generally aligned in a common plane so that legs 28 may be positioned so they are level and parallel with the floor. Each leg 28 may also include a distal portion 70 that may be generally parallel to axis 18 and each other and generally perpendicular to flange 26. Preferably, each leg 28 has an enlarged foot 72 at distal portion 70, preferably at a distal end 74 of leg 28 to prevent the object from sliding off or tipping over the end of legs 28 and for improved safety.

In this configuration, if a stud 2 is encountered, the screw-like drilling portion 24 may self-drill into the stud 2. Also, in this configuration, the U-shaped pair of legs 28, when positioned with its legs aligned horizontally with the floor, may be useful for holding a long handled item like a spade. Preferably, the U-shaped pair of legs and pair of flange openings are symmetrical so that when the flange begins to engage the wall, a slight further turn of no more than 180 degrees will position the legs 28 aligned horizontally and with one of the screw-engageable openings 30 centered above the legs for increased pullout resistance and load capacity.

It may be desirable that the spacing LS between legs 28 be large enough so that a typical handle of a broom or spade, i.e. a cylindrical handle having a diameter of between about 1 inch and about 1½ inches, will fit between legs 28. Preferably, foot 72 protrudes inwardly toward the other leg 28 so that the spacing FS between feet 72 may be smaller than spacing LS between legs 28, as shown in FIG. 3, and upwardly from leg 28, as shown in FIG. 4 to provide a stop on the inside edge of legs 28 to prevent a tool, such as a spade, from sliding between feet 72. In one embodiment, shown in FIGS. 3 and 4, foot 72 has rounded edges 76 facing outwardly for improved safety.

Preferably, the spacing FS and LS between feet 72 and legs 28 is large enough so that the nose of a typical cordless drill adapted with a screwdriver bit will fit between feet 72 and legs 28 so that a user may use the cordless drill to engage recess 64 and rotate holder 10 to drive anchor 12 through drywall. In one embodiment, the spacing LS between the pair of legs 28 may be between about 1½ inches and about 3 inches, preferably about 2 inches. In one embodiment, each foot 72 protrudes inwardly from its corresponding leg 28 between about 1/16 inch and about ¼ inch, preferably about ⅛ inch, so that for a pair of legs 28 with spacing LS of about 2 inches, the spacing FS between feet 72 may be between about 1½ inches and about 1¹⁵/₁₆ inches, preferably about 1¾ inches. Preferably, each foot extends upwardly from legs 28 by between about ¼ inch and about ¾ inch, preferably about ½ inch. In one embodiment, feet 72 are generally symmetrical on either side of legs 28 so that feet 72 extend upwardly and downwardly from legs 28, as shown in FIG. 4.

Continuing with FIGS. 1, 3, and 4, each side of distal portion 70 of each leg 28 may include upper and lower flat surfaces 78 which may be generally parallel to the common plane of legs 28 so that when legs 28 are level, an object laid across flat surfaces 78 will also be level. Legs 28 may also include one or more grooves 80 formed in each leg 28 so that an object may rest within the grooves 80. For example, an object having a thin portion that will be laying on legs 28, i.e. the blade of a shovel or spade, may be hung off legs 28 so that the thin portion rests in grooves 80 to prevent the spade from rolling or sliding along legs 28. In one embodiment, best seen in FIGS. 1 and 2, each leg includes two grooves 80 spaced apart by a stop 82 between flange 26 and foot 72.

Preferably, holder 10 is symmetrical, as shown in FIGS. 2 and 4, so that holder 10 may be functionally the same if it is rotated 180° about axis 18. Each leg 28 extending from flange 126 and the head or foot 72 at the distal end 74 of each leg 28 may be generally symmetrical about a plane containing axis 18 and bisecting each leg 28. This symmetry allows a user to drive anchor 12 into drywall 1 so that once flange 26 begins to engage outer drywall surface 44, the user only has to continue to rotate holder 10 slightly, i.e. no more than about an additional 179° before aligning legs 28 horizontally. In addition, if flange 26 has two openings 30 symmetrically spaced 180° apart and positioned equidistantly between legs 28, as shown in FIG. 4, when legs 28 are positioned so that they are level, one of openings 30 may be positioned so that it is generally centered vertically above axis 18 and the other opening 30 may be positioned so that it is generally centered vertically below axis 18 for insertion of fasteners 4 through flange 26 and into drywall 1 for increased pullout resistance and load capacity.

In another embodiment, referring to FIGS. 5, 6 and 7, a similar holder 110 includes a self-drilling anchor 112 having axis 118, exterior threading 120 for engaging friable substrate 11, proximal end 122, and drilling end 124, all substantially the same as the embodiment shown in FIGS. 1-4. In the embodiment shown, a flange or back plate 126 connected to proximal end 122 is generally ovoid or "surfboard" shaped. Flange 126 has a pair of openings 130 spaced from axis 118, each capable of receiving a smaller fastener (not shown), two legs 128 extending from flange 126 for holding an object, also substantially the same as the embodiment shown in FIGS. 1-4.

Holder 110 is mountable to a friable substrate 101 and is used for holding, typically hanging, an object (not shown), such as a tool, a ladder, a broom, a spade, a bicycle, or other objects on a friable substrate such as drywall 101, in the same fashion as the embodiment shown in FIGS. 1-4, as described above. Holder 110 may be made from a sturdy material such as plastic, nylon, steel or aluminum, and in one embodiment, cast zinc.

Preferably, holder 110 includes a recess 164, such as the Phillips recess 164 in flange 126 shown in FIGS. 5 and 6, for receiving a rotary driver (not shown) so that holder 110 may be installed with a driving tool, such as a screwdriver or a drill with a screwdriver bit. Recess 164 is preferably coaxial with axis 118 and includes torque transmitting surfaces so that torque may be transmitted from the rotary driver to rotate anchor 112 to drive anchor 112 through drywall 101. A user may also drive anchor 112 through drywall 101 by manually rotating legs 128, especially for final positioning after initially driving holder 110 with a rotary driver.

Continuing with FIGS. 5 and 6, the pair of legs 128 forms a U-shape. As indicated above, U-shaped holder 110 may be particularly useful for holding long handled objects, such as a spade or broom, so that the handle fits between legs 128 and the spade blade or the broom head rests on legs 128. Preferably, legs 128 are diametrically opposed, symmetrical about axis 118, and generally aligned in a common plane so that legs 128 may be positioned so they are level and parallel with the floor. Each leg 128 may also include a distal portion 170 that may be generally parallel to axis 118 and each other and generally perpendicular to flange 126. Preferably, each leg 128 has an enlarged foot 172 at distal portion 170, preferably at a distal end of leg 128 to prevent the object from sliding off or tipping over the end of legs 128 and for improved safety. For added gripping of the tool, etc., the legs 128 and feet 172 may be coated with a durable plastic material (not shown).

It may be desirable that the spacing LS between legs 128 be large enough so that a typical handle of a broom or spade, i.e. a cylindrical handle having a diameter of between about 1 inch and about 1½ inches, will fit between legs 128. Preferably, foot 172 protrudes inwardly toward the other leg 128 so that the spacing FS between feet 172 may be smaller than spacing LS between legs 128, as shown in FIG. 6, and upwardly from leg 128, as shown in FIG. 6 to provide a stop on the inside edge of legs 128 to prevent a tool, such as a spade, from sliding between feet 172. In one embodiment, shown in FIGS. 5 and 6, foot 172 has rounded edges 176 facing outwardly for improved safety.

Preferably, the spacing FS and LS between feet 172 and legs 128 is large enough so that the nose of a typical cordless drill adapted with a screwdriver bit will fit between feet 172 and legs 128 so that a user may use the cordless drill to engage recess 164 and rotate holder 110 to drive anchor 112 through drywall 101. In one embodiment, the spacing LS between the pair of legs 128 may be between about 1½ inches and about 3 inches, preferably about 2 inches. In one embodiment, each foot 172 protrudes axially inwardly from its corresponding leg 128 between about 1/16 inch and about ¼ inch, preferably about ⅛ inch, so that for a pair of legs 128 with spacing LS of about 2 inches, the spacing FS between feet 172 may be between about 1½ inches and about 2 inches, preferably about 1¾ inches. Preferably, each foot extends upwardly and downwardly from legs 128 by between about ¼ inch and about ¾ inch, preferably about ½ inch. In this regard, feet 172 are generally symmetrical on either side of legs 128 as shown in FIG. 6.

Continuing with FIGS. 5, 6 and 7, each side of distal portion 170 of each leg 128 may include upper and lower flat surfaces 178 which may be generally parallel to the common plane of legs 128 so that when legs 128 are level, an object laid across flat surfaces 178 will also be level. Legs 128 may also include one or more grooves 180 formed in each leg 128 so that an object may rest within the grooves 180. For example, an object having a thin portion that will be laying on legs 128, i.e. the blade of a shovel or spade, may be hung off legs 128 so that the thin portion rests in grooves 180 to prevent the spade from rolling or sliding along legs 128. In one embodiment, best seen in FIGS. 4 and 5, each leg includes three grooves 180 spaced apart by a stops 182 between flange 126 and foot 172, such that the length of each leg 128 from the flange 126 to the outer surface of the foot 172 is about ⅓ greater than that of each leg 28 in the the embodiment shown in FIGS. 1-4.

Preferably, holder 110 is symmetrical, as shown in FIGS. 5 and 6, so that holder 110 may be functionally the same if it is rotated 180° about axis 118.

In the same fashion as the embodiment shown in FIGS. 1-4, this symmetry allows a user to drive anchor 112 into drywall 101 so that once flange 126 begins to engage outer drywall surface 144, the user only has to continue to rotate holder 110 slightly, i.e. no more than about an additional 179° before aligning legs 128 horizontally. In addition, if flange 126 has two openings 130 symmetrically spaced 180° apart and positioned equidistantly between legs 128, as shown in FIG. 6, when legs 128 are positioned so that they are level, one of openings 130 may be positioned so that it is generally centered vertically above axis 118 and the other opening 130 may be positioned so that it is generally centered vertically below axis 118 for insertion of fasteners 104 through flange 126 and into drywall 101 for increased pullout resistance and load capacity.

In this configuration, if a stud 102 is encountered, the screw-like drilling portion 124 may self-drill into the stud 102. Also, in this configuration, the U-shaped pair of legs 128, when positioned aligned horizontally with the floor, may be useful for holding a long handled item like a spade. Preferably, the U-shaped pair of legs and pair of flange openings 130 are symmetrical so that when the flange begins to engage the wall, a slight further turn of no more than 180 degrees will position the legs 128 aligned horizontally with one of the screw-engageable openings 130 centered above the legs for increased pullout resistance and load capacity.

In another embodiment, referring to FIGS. 8 and 9, a similar holder 210 includes a self-drilling anchor 212 having axis 218, exterior threading 220 for engaging a friable substrate, proximal end 222, and drilling end 224, all substantially the same as the embodiment shown in FIGS. 1-4. In the embodiment shown, a flange or back plate 226 connected to proximal end 222 is generally oval or "surfboard" shaped. Flange 226 has a pair of openings 230 spaced from axis 218, each capable of receiving a fastener (not shown), also substantially the same as the embodiment shown in FIGS. 1-4.

Holder 210 has a single leg 228 extending from flange 226 for holding an object, and is mountable to a friable substrate such as drywall, in the same fashion as the embodiment shown in FIGS. 1-4, as described above. The leg 228 may also include a distal portion 270 which terminates in an enlarged, generally ovoid head 272 that may be symmetrical about the axis 218. Holder 210 may be made from a sturdy material such as plastic, nylon, steel or aluminum, and in one embodiment, cast zinc. The leg 228 and head 272 may be coated with a durable plastic material. (not shown).

Preferably, holder 210 includes a recess 264, such as the Phillips recess 264 in the head 272, shown in FIG. 8, for receiving a rotary driver (not shown) so that holder 210 may be installed with a driving tool, such as a screwdriver or a drill with a screwdriver bit. Recess 264 is preferably coaxial with axis 218 and includes torque transmitting surfaces so that torque may be transmitted from the rotary driver to rotate anchor 212 to drive anchor 212 through drywall. A user may also drive anchor 212 through drywall by using a tool to grip a flat surface, such as a hex surface 275 at the base of the leg 228 to rotate the holder, especially for final positioning after initially driving holder 210 with a rotary driver.

Continuing with FIGS. 8 and 9, the leg 228 forms an elongate, generally cylindrical shaft. Preferably, the leg 228 and the head 272 are symmetrical about axis 218, and generally so that leg 228 may be positioned level and parallel with the floor. As noted above, the leg 228 has an enlarged head 272 at a distal end of leg 228 to prevent an object from sliding off the end of legs 228 and for accomodating the recess 264.

The length of the leg 228 from the flange 226 to the outer surface of the head 272 may be from about ½ inch to about 3 inches. Preferably, holder 210 is symmetrical, as shown in FIGS. 8 and 9, so that holder 210 maybe functionally the same if it is rotated 180° about axis 218.

In the same fashion as the embodiment shown in FIGS. 1-4, this symmetry allows a user to drive anchor 212 into drywall 101 so that once flange 226 begins to engage outer drywall surface, the user only has to continue to rotate holder 210 slightly, i.e. no more than about an additional 179° before aligning the two openings 230 in a desired orientation, e.g., so that one of openings 230 is positioned generally centered vertically above axis 218 and the other opening 230 is positioned generally centered vertically below axis 218 for insertion of fasteners 204 through flange 226 and into drywall for increased pullout resistance and load capacity.

In this configuration, if a stud is encountered, the screw-like drilling portion 224 may self-drill into the stud.

In another embodiment, referring to FIGS. 10 and 11, a similar holder 310 includes a self-drilling anchor 312 having axis 318, exterior threading 320 for engaging friable substrate 311, proximal end 322, and drilling end 324, all substantially the same as the embodiment shown in FIGS. 1-4. In the embodiment shown, a flange or base plate 326 connected to proximal end 322 is generally oval or "surfboard" shaped. Flange 326 has a pair of openings 330 spaced from axis 318, each capable of receiving a fastener, also substantially the same as the embodiment shown in FIGS. 1-4.

Holder 310 has a single leg 328 extending from flange 326 for holding an object, and is mountable to a friable substrate such as drywall, in the same fashion as the embodiment shown in FIGS. 1-4, as described above. The leg 328 may also include a distal portion 370 that may be generally parallel to axis 318 and terminates in an enlarged head 372. In the embodiment shown, this head 372 is generally flat and oval or "surfboard" shaped, and is generally congruent with, smaller than and coaxial with flange or back plate 326. Holder 310 may be made from a sturdy material such as plastic, nylon, steel or aluminum, and in one embodiment, cast zinc. The leg 328 and head 372 may be coated with a durable plastic material (not shown).

Preferably, holder 310 includes a recess 364, such as the Phillips recess 364 in the head 372 and leg 328, shown in FIG. 8, for receiving a rotary driver (not shown) so that holder 310 may be installed with a driving tool, such as a screwdriver or a drill with a screwdriver bit. Recess 364 is preferably coaxial with axis 318 and includes torque transmitting surfaces so that torque may be transmitted from the rotary driver to rotate anchor 312 to drive anchor 312 through drywall. A user may also drive anchor 312 through drywall by manually gripping grip the head 372 to rotate the holder, especially for final positioning after initially driving holder 310 with a rotary driver.

Continuing with FIGS. 10 and 11, the leg 328 forms an elongate, generally cylindrical shaft. Preferably, the leg 328 and the head 372 are symmetrical about axis 318, and generally so that leg 328 may be positioned level and parallel with the floor. As noted above, the leg 328 has an enlarged head 372 at a distal end 374 of leg 328 to prevent an object from sliding off or tipping over the end of leg 328 and for accomodating the recess 364 and its torque transmitting surfaces. Head 372 may have rounded edges facing outwardly for improved safety.

The length of the leg 328 from the flange 326 to the outer surface of the head 372 may be from about ½ inch to about 3 inches. Preferably, holder 310 is symmetrical, as shown in FIGS. 8 and 9, so that holder 310 may be functionally the same if it is rotated 180° about axis 318.

In the same fashion as the embodiment shown in FIGS. 1-4, this symmetry allows a user to drive anchor 312 into drywall so that once flange 326 begins to engage an outer drywall surface, the user only has to continue to rotate holder 310 slightly, i.e. no more than about an additional 179° before aligning the two openings 330 in a desired orientation, e.g., so that one of openings 330 is positioned generally centered vertically above axis 318 and the other opening 330 is positioned generally centered vertically below axis 318 for insertion of fasteners through openings 330 and into drywall for increased pullout resistance and load capacity.

In one embodiment, each of the above-described holders 10, 110, 210 and 310 includes a similar self-drilling anchor 12, 112, 212, 312. In the description which follows, the anchor 12 will be described, with reference to FIGS. 1-4, it being understood that the anchors 112, 212, 312 are substantially the same. The anchor 12 has an axis 18, a drilling portion 34 having a length longer than a thickness T of the friable substrate 1 and a high-threaded proximal portion 32 for engaging friable substrate 1, a flange 26 connected to proximal portion 32 of said anchor 12, wherein flange 26 is substantially wider than a largest outside diameter of proximal portion 32, and at least one, and in some embodiments, two legs 28 extending from flange 26 for holding an object.

Anchor 12 may have a long unthreaded drilling portion 34 of the type sold under the trademark E-Z ANCOR by ITW Buildex and shown in the commonly assigned U.S. Pat. No. 4,601,625, or may be similar to an anchor sold under the trademark STUD SOLVER, see commonly assigned U.S. patent application Ser. No. 60/510,708, which is a self-drilling drywall anchor capable of penetrating studs. Because anchor 12 does not receive a fastener, cf. U.S. Pat. No. 4,601,625, and U.S. patent application Ser. No. 60/510,708, anchor 12 may be solid rather than hollow, allowing anchor 12 to have a smaller root diameter while still providing the durability necessary to be driven into drywall 1 and stud 2.

In one embodiment, shown in FIGS. 3 and 4, holder 10 includes self-drilling anchor 12 having axis 18, screw-like drilling portion 34 longer than thickness T of drywall 1 and high-threaded drywall engaging proximal portion 32, a drywall contacting flange 26 coaxially connected to proximal portion 32 of anchor 12, wherein flange 26 is substantially wider than a largest outside diameter of proximal portion 32. Continuing with FIGS. 3 and 4, in one embodiment, self-drilling anchor 12 includes a high-threaded proximal portion 32 having threading 20 with a crest diameter and a high thread height for engaging drywall 1, and threaded drilling portion 34 longer than a thickness T of drywall 1 and threading 50 with a crest diameter substantially smaller than the crest diameter of proximal portion 32 and a thread height substantially smaller than the thread height of proximal portion 32.

Preferably, the crest diameter of threading 20 of proximal portion 32 is about twice the root diameter of threading 50. In one embodiment, the crest diameter of threading 20 may be between about ¼ inch and about ¾ inch, preferably about ½ inch, the root diameter at proximal portion 32 may be between about ⅛ inch and about ⅜ inch, preferably about ¼ inch, and the thread height of threading 50 may be between about ⅛ inch and about ⅝ inch, preferably about ¼ inch. Preferably, high-threaded proximal portion 32 is slightly longer than drywall thickness T so that high threading 20 is able to engage paper 43 on inner drywall surface 42 to add further to the pullout resistance and load capacity of holder 10. In one embodiment, drywall gripping threading 20 may be one continuous generally helical thread 21 and the root of proximal portion 32 expands tapers from drilling portion 34 toward proximal end 22 so that anchor 12 has enough strength to be driven into wood. In one embodiment, shown best in FIG. 4, anchor includes a flared portion at proximal end 22 that is substantially smaller than flange 26. The flared portion allows a user to more easily continue to rotate holder 10 when the flared portion and flange 26 begin to contact drywall 1 because the user only has to push the small flared portion into drywall 1, and not the entire flange 26.

The screw-like drilling portion 34 with a length longer than drywall thickness T allows anchor 12 to bore a hole entirely through drywall 1 before high threading 20 on proximal portion 32 begins to engage drywall 1. The screw-like smaller threading 50 of drilling portion 34 also allows anchor 12 to be able to grip and drill into stud 2 if a user encounters stud 2 while installing holder 10 because the substantially smaller thread height and crest diameter of drilling portion 34 may be driven into stud 2 without excessive torque. In one embodiment, the crest diameter of threading 50 of drilling portion 34 is between about 1/16 inch and about ¼ inch, preferably about ⅛ inch, and the thread height of threading 50 is between about 0.02 inch and about 0.07 inch, preferably about 0.035 inch Threading 50 may include a generally helical thread 51a, as shown in FIG. 4, which may continue as thread 21 on proximal portion 32 so that there may be a continuous thread between drilling portion 34 and proximal portion 32. In one embodiment, drilling portion 34 includes two generally helical threads 51a, 51b arranged in a double helix to provide added support around drilling portion 34, to provide faster engagement of anchor 12 with stud 2, and to provide balanced driving into stud 2. Second thread 51b of the double helix may be present for only a portion of drilling portion 34 proximate drilling end 24, as shown in FIG. 4, or it may continue substantially through all of drilling portion 34 to provide improved grip with stud 2.

Anchor 12 may include a drill tip 46 at drilling end 24. In one embodiment, shown in FIG. 4, drill tip 46 is generally conical in shape and coaxial with axis 18 so that drill tip 46 comes to point at axis 18 to guidedly and quickly engage outer drywall surface 44 and the surface of stud 2. In one embodiment, drilling portion 34 may include at least one wing 60, and preferably a pair of wings 60, that protrudes radially outwardly from drilling portion 34 for reaming out drywall 1 to form a hole having the desired size. Wings 60 are designed to break away when they hit stud 2 so that wings 60 ream out drywall 1 and not stud 2.

Method of Use

In the description which follows, the method of use of the anchor 12 will be described, with reference to FIGS. 1-4, it being understood that the methods of use of the anchors 112, 212, 312 are substantially the same Holder 10 may be used by a method including the steps of selecting a location on a wall or ceiling, positioning holder 10 with drill tip 46 against the wall or ceiling at the selected position, rotating holder 10 in a clockwise direction so that anchor 12 drills through drywall 1, continuing to rotate holder 10 until flange 26 begins to engage outer drywall surface 44, preferably manually turning holder 10 to align legs 28 horizontally and so that one of the openings 30 may be generally vertically above axis 18, inserting fastener 4 into the opening 30 that may be above axis 18, driving fastener 4 so that fastener threads 8 threadingly engage opening 30 and drywall 1, driving fastener 4 through drywall 1 until fastener head 6 abuts flange 26, and hanging or holding the tool or other object off one or both legs 28. The method may also include the step of inserting a second fastener 4 into the other opening 30, driving the second fastener 4 so that threads 8 of the second fastener 4 threadingly engage bottom opening 30 and drywall 1, and driving the second fastener 4 through drywall 1 until head 6 of the second fastener 4 abuts flange 26.

A user may select a position on the wall or ceiling without worrying about the location of a stud 2 located behind drywall 1 because of the configuration of external threading 20 and 50, which allows anchor 12 to drill through drywall 1 and a stud 2. This feature also allows a user to intentionally position holder 10 so that anchor 12 does hit stud 2, because there may be greater hold between anchor 12 and stud 2 because support member may be less likely to break apart than drywall 1. The ability to position holder 10 virtually anywhere along a wall or ceiling allows a user to arrange a plurality of holders 10 on the wall or ceiling for more efficient use of the space allowing a plurality of objects to be held while only needing to install holders 10 and mounting fasteners 4 with a screwdriver or other rotary driver.

The step of rotating holder 10 may be accomplished by inserting a rotary driver into recess 64 in flange 26 and driving holder 10 with the rotary driver, and/or by manually rotating legs 28, which in turn rotates flange 26 and anchor 12. Driving holder 10 with a rotary driver is preferred, at least until final rotary positioning, because it is generally easier to control the driving while keeping holder 10 generally axially aligned.

The holder of the present invention provides for the combination of a self-drilling anchor and an opening spaced from the axis of the anchor for receiving a fastener to increase the overall pullout resistance and load capacity of the holder. In one embodiment, the opening engages threads of the fastener to meter and stop the fastener so that the fastener engages the drywall without stripping it out, increasing engagement between the fastener threads and the drywall. The holder also allows a user to hold an object at virtually any position on a surface of a wall or ceiling, even at a location where a support member may be behind the drywall.

Method of Making

A holder of the type described above, and comprising a self-drilling anchor having an axis, exterior threading for engaging said friable substrate, a proximal end, and a drilling end; a flange connected to said proximal end of said anchor, said flange being wider than a largest outside diameter of said exterior threading, and at least one leg extending from said flange for holding an object; wherein said at least one leg is generally symmetrical about one of said axis and a second axis parallel to said axis, may be made by a method comprising the steps of:

Providing a pair of molds having complementary mating cavities, together defining said holder, feeding molten material into said cavity; setting said molten material to form said holder; and removing said holder from said mold.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A holder mountable to a friable substrate comprising:
   a unitary structure comprising;
   a self-drilling anchor having an elongated body having an axis, exterior threading for engaging said friable substrate, a proximal end, and a drilling end; wherein said proximal end comprises a proximal portion, said proximal portion having exterior threading having a root and a crest diameter, said proximal portion further having a thread height of at least about ¼ inch;
   a flange formed as a single piece with said proximal end of said anchor, said flange being wider than a largest outside diameter of said exterior threading;
   a protrusion, formed as a single piece with and extending outwardly from said flange having an axial recess for receiving a rotary driver;
   a pair of legs extending radially outwardly from opposite sides of said protrusion and outwardly from said flange for holding an object;
   wherein said pair of legs are generally symmetrical about a plane containing said axis and bisecting said pair of legs;
   and wherein each of said pair of legs extends radially and axially outwardly from said flange and said protrusion to a distal end spaced axially beyond said protrusion.

2. A holder according to claim 1, wherein at least one leg has a foot, and wherein said foot is generally symmetrical about a plane containing said axis and bisecting said at least one leg.

3. A holder according to claim 1, wherein at least one leg has a head, and wherein said head is generally symmetrical about a plane containing said axis and bisecting said at least one leg.

4. A holder according to claim 1, further comprising an opening in said flange spaced from said axis, wherein said opening is capable of receiving a fastener.

5. A holder according to claim 4, further comprising a second opening in said flange spaced from said axis, wherein each opening is capable of receiving a fastener, wherein said openings are generally on opposite sides of said axis.

6. A holder according to claim 1, wherein said pair of legs form a U-shape for holding said object.

7. A holder according to claim 6, wherein said pair of legs are generally aligned in a common plane.

8. A holder according to claim 1, wherein said distal portion of each of said legs is generally parallel to said axis and each of said legs has an enlarged foot coupled to and generally symmetrical about said distal portion.

9. A holder according to claim 8, wherein each of said legs further comprises a plurality of alternating grooves and stops between said flange and said enlarged foot.

10. A holder according to claim 1, wherein said elongated body further comprises:
an intermediate portion, a distal portion, and a tilling tip at said drilling end;
said intermediate portion having a threaded exterior having a root, a crest diameter substantially smaller than said crest diameter of said proximal portion, and a thread height substantially smaller than said thread height of said proximal portion;
said distal portion having a threaded exterior with a root that tapers toward said drilling tip, a crest diameter substantially smaller than said crest diameter of said proximal portion, and a thread height substantially smaller than said thread height of said proximal portion.

11. A holder mountable to a friable substrate, comprising:
a self-drilling anchor having an axis, a drilling portion having a length longer than a thickness of said friable substrate and a high-threaded proximal portion for engaging said friable substrate, said high-threaded proximal portion having a thread height of at least about ¼ inch;
a flange formed as a single piece with said proximal portion of said anchor, said flange being wider than a largest outside diameter of said high-threaded proximal portion, said flange formed with a protrusion extending from said flange and having an axial recess for a rotary driver and
a pair of legs extending radially outwardly from opposite sides of said protrusion and outwardly from said flange for holding an object, wherein said pair of legs are generally symmetrical about a plane containing said axis and bisecting said pair of legs;
wherein said at least one leg has a distal portion that extends generally outwardly from said flange;
and further wherein said holder is functionally the same when rotated 180 degrees about said axis.

12. A holder according to claim 11, wherein said pair of legs form a U-shape for holding said object, and wherein each of said legs includes a distal portion generally parallel to said axis and each of said legs has an enlarged foot generally symmetrical about said distal portion.

13. A holder according to claim 11, wherein each of said legs further comprises a plurality of alternating grooves and stops between said flange and said foot.

14. A holder mountable to drywall and a stud, comprising:
a unitary structure comprising;
a self-drilling anchor having an axis, a screw-like drilling portion having a length longer than a thickness of said drywall and a high-threaded drywall engaging proximal portion;
a wall-contacting flange formed as a single piece with said proximal portion of said anchor, said flange being substantially wider than a largest outside diameter of said proximal portion, said flange formed with a protrusion extending therefrom having an axial recess for receiving a rotary driver;
a U-shaped pair of legs for holding an object, wherein each of said legs extends radially outwardly from opposite sides of said protrusion and both radially and axially outwardly from said flange to a distal portion having an enlarged foot, wherein said legs are generally parallel at said distal portions and said legs and each said enlarged foot are generally symmetrical about a plane containing said axis and bisecting said at least one leg and further wherein said holder is functionally the same when rotated 180 degrees about said axis; and
an opening in said flange spaced outwardly from said axis, wherein said opening is generally aligned in said plane.

15. A holder according to claim 14, wherein each of said legs further comprises a plurality of alternating grooves and slops between said flange and said enlarged foot.

16. A holder according to claim 11, further comprising a flat gripping surface at a base of at least one of said pair of legs to rotate the holder.

17. A method for installing a holder in friable material, comprising:
providing a holder comprising
a unitary structure comprising:
a self-drilling anchor having an elongated body having an axis, exterior threading for engaging said friable substrate, a proximal end, and a drilling end; wherein said proximal end comprises a proximal portion, said proximal portion having exterior threading having a root and a crest diameter, said proximal portion further having a thread height of at least about ¼ inch:
a flange formed as a single piece with said proximal end of said anchor, said flange being wider than a largest outside diameter of said exterior threading;
a protrusion, formed as a single piece with and extending outwardly from said flange having an axial recess for receiving a rotary driver;
a pair of legs extending radially outwardly from opposite sides of said protrusion and outwardly from said flange for holding an object;
wherein said pair of legs are generally symmetrical about a plane containing said axis and bisecting said pair of legs:
and wherein each of said pair of legs extends radially and axially outwardly from said flange and said protrusion to a distal end spaced axially beyond said protrusion;
applying a torsion force to rotate said holder to drive the drilling end through the friable material, and
continuing to rotate the holder until the flange begins to engage an outer surface of said friable material.

18. A method for installing according to claim 17, and further including manually rotating the holder to align said flange in a desired orientation.

19. A method for installing according to claim 17, wherein the step of rotating the holder comprises inserting a rotary driver into said axial recess and driving the holder with the rotary driver.

20. A method of making a holder comprising
a unitary structure comprising;
a self-drilling anchor having an elongated body having an axis, exterior threading for engaging said friable substrate. a proximal end. and a drilling end: wherein said proximal end comprises a proximal portion, said proximal nortion having exterior threading having a root and a crest diameter, said proximal portion ttrther having a thread heiaht of at least about ¼ inch:
a flange formed as a single piece with said proximal end of said anchor, said flange being wider than a largest outside diameter of said exterior threading;

a protrusion. formed as a single piece with and extending outwardly from said flange having an axial recess for receiving a rotary driver;

a pair of legs extending radially outwardly from opposite sides of said protrusion and outwardly from said flange for holding an object;

wherein said pair of legs are generally symmetrical about a plane containing said axis and bisecting said pair of legs;

and wherein each of said pair of legs extends radially and axially outwardly from said flange and said protrusion to a distal end spaced axially beyond said protrusion: the method comprising the sleps of providing a pair of molds having complementary mating cavities, together defining said holder, feeding molten material into said cavity;

setting said molten material to form said holder; and removing said holder from said mold.

\* \* \* \* \*